(No Model.)
E. H. SNYDER.
GARDEN RAKE.
No. 567,364. Patented Sept. 8, 1896.
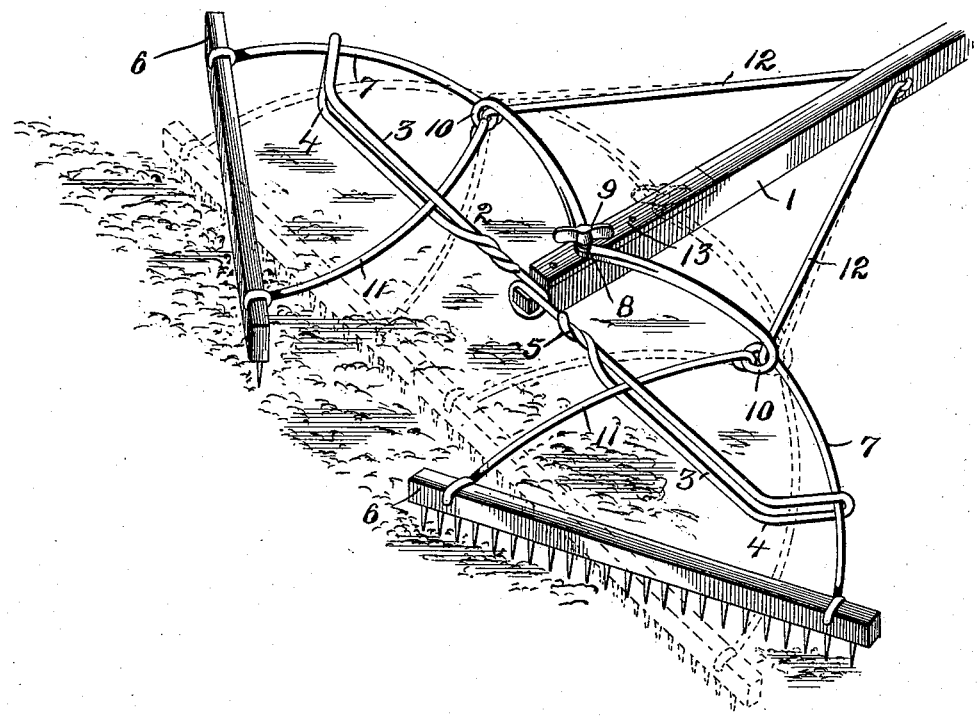
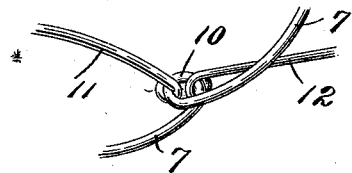
Witnesses
H. J. Koerth.
R. M. Smith.
Inventor
Emanuel H Snyder
By his Attorneys.
C A Snow & Co.

UNITED STATES PATENT OFFICE.

EMMANUEL H. SNYDER, OF BURDETTE, IOWA.

GARDEN-RAKE.

SPECIFICATION forming part of Letters Patent No. 567,364, dated September 8, 1896.

Application filed June 19, 1895. Serial No. 553,348. (No model.)

*To all whom it may concern:*

Be it known that I, EMMANUEL H. SNYDER, a citizen of the United States, residing at Burdette, in the county of Franklin and State of Iowa, have invented a new and useful Garden-Rake, of which the following is a specification.

This invention relates to an improvement in garden-rakes, and has for its object to provide a simple, inexpensive, and efficient rake in which the rake head or bar which carries the rake-teeth is divided or formed in twin sections, which are capable of adjustment toward and away from each other for leaving an intervening space of any desired width for the purpose of adapting the implement to work simultaneously upon both sides of a row of plants.

A further object of the invention is to construct and arrange the twin sections or members of the rake in such manner that they may be adjusted to any desired angle with relation to the rake-handle and to each other, whereby they are adapted to automatically rake the soil inwardly upon either side of the hill or row being cultivated.

In order to accomplish the objects above mentioned, the invention consists in a rake comprising twin members, each provided with a series of rake-teeth and mounted in such manner as to be capable of being adjusted toward and away from each other and as to their angle with relation to each other and to the handle of the implement, and in the means for securing and holding said members at the desired adjustment.

The invention also consists in certain novel features and details of construction and arrangement of parts, as hereinafter fully described, illustrated in the drawings, and finally pointed out in the claims.

In the accompanying drawings, Figure 1 is a perspective view of an improved garden-rake constructed in accordance with this invention. Fig. 2 is a detail perspective view adjacent to the coil or twist in one of the adjusting-arms.

Similar numerals of reference designate corresponding parts in both figures of the drawings.

Referring to the accompanying drawings, 1 designates the handle of the rake, which is formed, preferably, of wood.

2 designates a cross-head secured to the lower end of the handle and composed, preferably, of stout wire and from a single piece thereof bent or coiled at its central portion to engage the lower end of the rake-handle and having its terminals extended laterally upon opposite sides of the handle any desired distance and then bent back upon each other, a sufficient space being left between the outwardly-extending portion of each terminal and the return portion thereof to constitute a guiding-frame 3, adapted to permit the adjustment of the rake members hereinafter described and to steady and brace the same. The outer portions of these oppositely-extending guiding-frames are each given a bend at the point 4 and extended backwardly to provide for a greater adjustment of the rake members without the necessity of extending the guiding-frames to too great an extent laterally. The extremities of the terminals of this guiding-frame are given several twists around the outwardly-extending portions of the guiding-frame, as indicated at 5.

6 designates the rake-bar, which, for the purposes of carrying out this invention, is divided centrally or formed in two equal and similar sections, as shown, each of which is provided with a number of rake-teeth of any desired or preferred pattern.

7 represents a curved arm, which is made preferably from stout wire, being connected rigidly at its outer end to the corresponding end of its respective rake-bar section 6, the inner end of said wire arm being looped or formed with an eye 8, which is adapted to receive the shank of a thumb-screw 9. Intermediate the ends of this curved arm the latter, in the process of manufacture, is given one complete turn or coil to form an eye or loop 10, and the latter receives the inner looped and twisted end of a stout wire arm or brace 11, which extends forwardly and is connected rigidly at its outer end to the inner end of its respective rake-bar section or adjacent to said end, as shown in the drawings.

12 indicates a diagonal or obliquely-extending brace, which is also made from stout wire and has its outer end looped to engage the eye or loop 10 of the curved arm 7, the inner end of said brace being rigidly attached to the adjacent side of the rake-handle in any convenient manner.

It will be understood that the parts just described are duplicated upon the other side of the rake-handle, thus forming two separate and independent rake members, the curved arms 7 of which are provided at their inner ends each with an eye 8. The thumb-screw 9 passes through both of said eyes and is adapted to engage any one of a series of threaded perforations or sockets in a metal plate 13, secured to the upper face of the rake-handle, adjacent to the lower end thereof, as shown.

From the foregoing description it will be seen that by adjusting the inner ends of the curved arms which control the positions of the rake members the distance between the inner ends of the rake-bar sections may be increased or diminished to any desired extent, the forward ends of the diagonal braces yielding laterally or toward and away from the rake-handle to permit such adjustment, and the curved or adjusting arms 7 being adapted to swing or rock upon the forward ends of said diagonal braces as centers.

It will also be noted that the outer portion of each curved arm 7, beyond the eye or loop therein, and the arm or brace 11, both of which connect rigidly to the rake-bar sections, lie within and are adapted to be steadied and braced by the double guiding-frame 3.

By the construction described the rake members may be brought together in such manner as to form, practically, an ordinary straight rake, or said members may be separated and disposed at an angle to each other and to the rake-handle, thereby adapting the implement to be used for cultivating plants, &c., arranged in rows, the rake members being adapted to stride a row of plants and, as it is manipulated, to gradually work the soil inward upon each side of the plants.

Changes in the form, proportion, and minor details of construction may be resorted to without departing from the spirit or sacrificing any of the advantages of this invention.

Having thus described the invention, what is claimed as new, and desired to be secured by Letters Patent, is—

1. In a garden-rake, the combination with a suitable handle, of two independent rake members, each comprising a toothed bar and a wire supporting-frame rigidly connected therewith, the inner ends of said frames being adjustably connected with said handle, diagonally-disposed flexible arms or braces connected with said handle and having the rake members pivotally connected to their forward ends, the looped or slotted guiding frame or arm rigidly connected with said handle and having the frames of the rake members arranged to slide therethrough, and means for adjusting and holding said frames at any angle and with their inner ends at the desired distance apart, substantially in the manner and for the purpose specified.

2. The combination in a garden-rake, of a handle, a cross-head rigidly attached to the handle and projecting upon opposite sides thereof and looped or slotted to form combined guides and supports for the rake members, said rake members loosely mounted in the guides and having pivotal connection with the handle, and provision whereby the angles of the rake members may be adjusted, substantially as described.

3. In a garden-rake, the combination with a suitable handle, of adjustable frames connected to the handle, flexible diagonal braces secured permanently to the handle at points intermediate the ends of the latter and forming the fulcrums for said frames, and the inwardly-projecting arms rigidly connected to said frames at their rear ends and made adjustable longitudinally of the handle, substantially as described.

In testimony that I claim the foregoing as my own I have hereto affixed my signature in the presence of two witnesses.

EMMANUEL H. SNYDER.

Witnesses:
J. F. BYERS,
GEO. G. LIVERGOOD.